United States Patent [19]
Hintz

[11] Patent Number: 5,873,147
[45] Date of Patent: Feb. 23, 1999

[54] MULTI-PLANAR GOLF CART HANDLE

[76] Inventor: Kurtis W. Hintz, 524 Birch La., Hartford, Wis. 53027

[21] Appl. No.: 703,511

[22] Filed: Aug. 27, 1996

[51] Int. Cl.$^6$ .................................................. A47B 95/02
[52] U.S. Cl. ...................... 16/110 R; 16/115; 280/DIG. 6
[58] Field of Search ............................. 16/110 R, 111 R, 16/114 R, 125, 115, DIG. 12, DIG. 19; 280/DIG. 6, 651, 654, 653, 652, 655, 642, 47.36, 47.371, 47.34, 47.17; 294/57; D8/300, 303, 312, 313, 315, DIG. 1; D34/27, 17, 20, 21

[56] References Cited

U.S. PATENT DOCUMENTS

| | | | |
|---|---|---|---|
| D. 161,249 | 12/1950 | Darr | D34/27 |
| D. 186,428 | 10/1959 | Gunning | D14/3 |
| D. 331,652 | 12/1992 | Wu | D34/27 |
| D. 339,892 | 9/1993 | Wu | D34/27 |
| D. 357,104 | 4/1995 | Valentini | D34/12 |
| D. 361,190 | 8/1995 | Gingras et al. | D34/12 |
| D. 375,601 | 11/1996 | Myers | D34/27 |
| D. 393,514 | 4/1998 | Hadley et al. | D34/27 |
| 2,743,115 | 4/1956 | Rutledge | 280/DIG. 6 |
| 3,423,103 | 1/1969 | Maltarp | 280/47.37 |
| 3,631,559 | 1/1972 | Gaudry et al. | 15/144 |
| 4,455,030 | 6/1984 | Rosen | 280/47.19 |
| 4,537,414 | 8/1985 | Nusbaum | 280/47.41 |
| 4,681,341 | 7/1987 | Lai | 280/646 |
| 5,007,301 | 4/1991 | Powell | 74/557 |
| 5,193,842 | 3/1993 | Fontenot | 280/645 |
| 5,232,065 | 8/1993 | Cotton | 180/11 |
| 5,482,485 | 1/1996 | Ball | 441/65 |

*Primary Examiner*—Chuck Y. Mah
*Attorney, Agent, or Firm*—Andrus, Sceales, Starke & Sawall

[57] ABSTRACT

A golf cart handle adapted to be gripped using one's hands includes a central portion adapted to be mounted on the golf cart and a pair of laterally disposed winged portions. Each of the winged portions is connected to the central portion at an angle such that each of the winged portions extends outwardly, upwardly and rearwardly of the central portion.

10 Claims, 4 Drawing Sheets

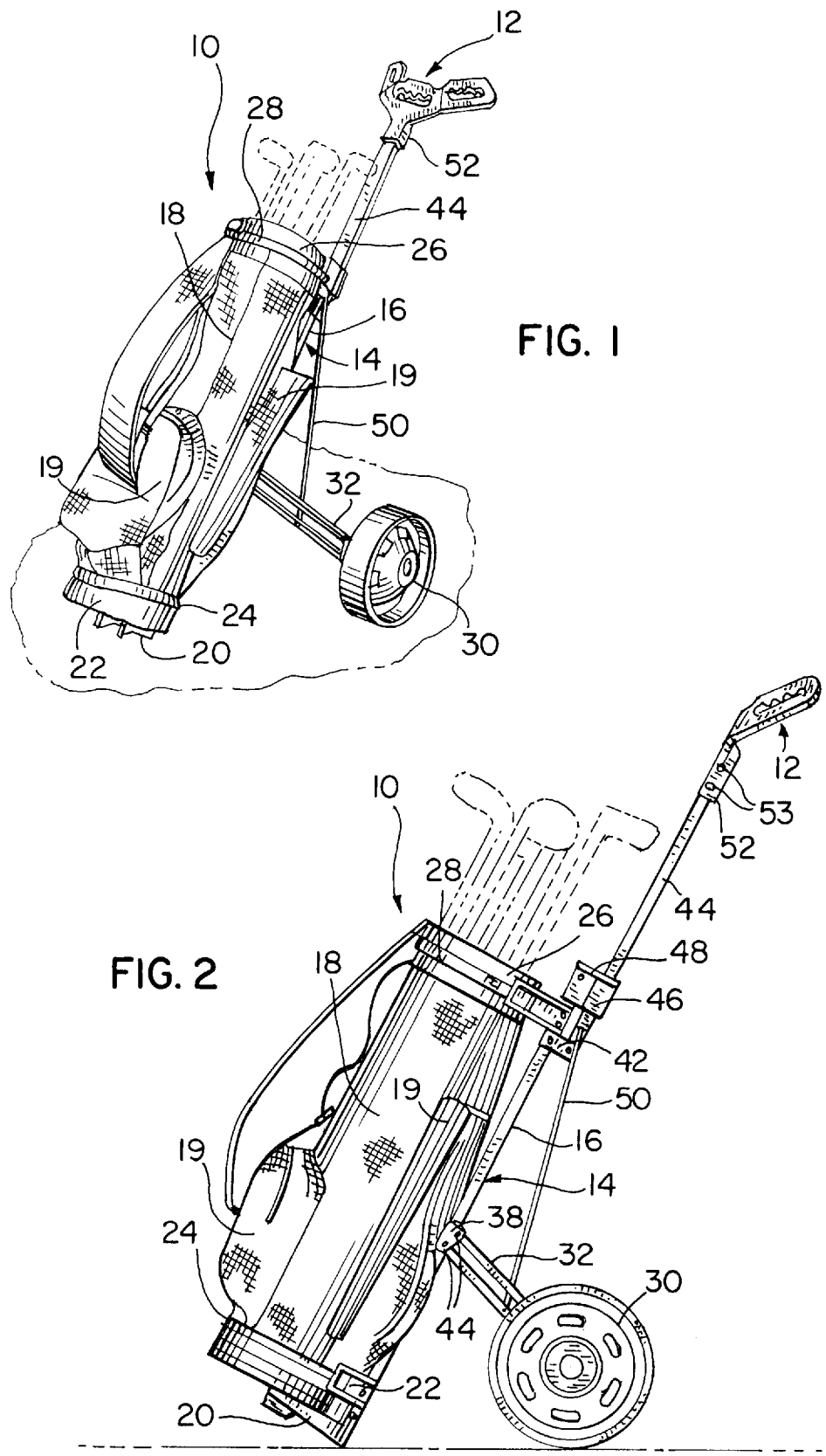

MULTI-PLANAR GOLF CART HANDLE

FIELD OF THE INVENTION

The present invention broadly relates to a cart and, more particularly, pertains to a cart of the type adapted for attachment to a golf bag and which is manually wheeled and steered by the golfer.

BACKGROUND AND SUMMARY OF THE INVENTION

Golf is a game which has an enthusiastic following throughout the world. In addition to the selections of clubs ordinarily used by a golfer, golfers traditionally carry accessories such as umbrellas, additional sportswear dictated by the changes in weather, extra golf balls and the like. Accordingly, most golf bags are designed having a primary compartment for the reception of clubs and supplementary compartments or pockets for various accessories as mentioned. A complete golf bag carrying 16 golf clubs permitted under U.S.G.A. rules as well as accessories can be quite bulky and heavy.

Some golfers, due to the size and weight of the golf bag, prefer to play a round of golf utilizing a gas powered or electrically-powered golf cart vehicle. Other golfers prefer to walk the golf course in order to obtain the healthful benefit of exercise and to more fully enjoy the game. Golfers who prefer to walk the golf course are faced with the choice of carrying their clubs, which can become tedious and tiring, or transporting the bag, golf clubs and accessories on a cart of the type generally known as a pull cart.

Pull carts generally include a frame member with a pair of wheels, an elongated handlebar and a handle. The golf bag can be detachably secured to the frame. In improved versions of the golf carts, the carts are collapsible, generally having a pair of wheels which can be moved from a collapsed position adjacent to the frame to an extended position by means of arms or support members slidably or pivotally attached to the frame.

Most non-motorized golf carts are pulled or pushed by means of a single grip U-shaped or oval-shaped handle which is generally attached to the top of the handlebar often in a manner whereby the handlebar is telescoped or pivoted into a storage position during transport. Examples of this simple handle structure are shown in U.S. Pat. Nos. 4,455,030, 5,193,842 and 5,232,065. The problem with using this type of handle is that pushing or pulling of a golf cart creates unequal pressure on the back, shoulders and arms. In all too many cases, the golfer is subjected to discomfort and pain during or following his or her round of golf. Some attempts have been made to provide a double grip handle to alleviate the aforementioned problem. These handles are shown in U.S. Design Pat. Des. 186,428 as well as U.S. Pat. Nos. 4,681,341 and U.S. Design Pat. Des. 357,104. While the latter type of handles may offer some relief from the aches and pains caused by prior art golf carts, it remains desirable to provide an improved golf cart handle which will place equal pressure and reduce stress on the back, shoulders and arms of the golfer pushing or pulling the cart. It is also important to provide a golf cart handle which will not increase the storage and transport volume of the golf carts currently available.

Accordingly, it is a principal object of the invention to provide a golf cart handle for use with a pushable/pullable golf cart.

It is also an object of the invention to provide a golf cart handle which is light-weight, durable and economical to manufacture.

It is another object of the invention to provide a golf cart handle which may be retrofitted on existing golf carts.

It is a further object of the invention to provide a golf cart handle which is manipulable using two hands or one hand.

It is yet a further object of the invention to orient a golf cart handle at an angle which will create equal pressure on the anatomy of the golfer pushing/pulling the golf cart.

In one aspect of the invention, a golf cart handle adapted to be gripped using one's hands comprises a central portion adapted to be mounted on the golf cart and a pair of laterally disposed wing portions, each of the wing portions being connected to the central portion at an angle such that each of the Wing portions extends outwardly, upwardly and rearwardly of the central portion. The central portion and the wing portions are each formed with an continuous, inner wall having a top segment merging with a bottom segment and defining a substantially elongated slot for receiving the fingers of one's hand. Each of the walls includes a scalloped formation along the bottom segment thereof. The central portion and each of the adjoining wing portions are formed with a notch for receiving the thumb of one's hand. Each of the wing portions is oriented at an angle in the range of 140° to 150° relative to the central portion. Each of the wing portions is joined to the central portion along a line which is displaced appropriately 60° from a horizontal axis bisecting the central portion. Each of the wing portions extends downwardly from the horizontal axis bisecting the central portion at an angle in the range of 50° to 55°.

In another aspect of the invention, a handle to be attached to the handlebar of a non-motorized golf cart adapted to be pushed and pulled using one's hands comprises a central planar portion adapted to be mounted on the frame of the golf cart, the central planar portion providing a first pistol style grip adapted to be gripped by one's hand. A pair of laterally disposed winged planar portions is angularly connected to the central planar portion, each of the wing planar portions providing a second pistol style grip adapted to be gripped by one's hand. With this construction, the golf cart is pushable and pullable using the first pistol style grip or the second pistol style grip.

In yet another aspect of the invention, a handle to be fixed to a pullable/pushable golf cart comprises a central portion adapted to be mounted on the handlebar of the golf cart, the central portion having a top wall and a bottom wall connected by a pair of sidewalls. The handle includes a pair of laterally disposed wing portions, each of the wing portions being angularly and fixedly attached to one of the sidewalls of the central portion, and each of the wing portions having a top wall and a bottom wall connected by a pair of side walls. Each of the central portions and the wing portions are formed with an aperture for receiving the fingers of one's hand to be wrapped about the bottom wall of the central portion or the bottom walls of the winged portions. Each of the bottom walls of the central portion and the winged portions are formed with notches for receiving the thumb of one's hand.

Still yet a further object of the invention resides in a handle to be fixed to a handlebar of a golf cart adapted to be pushed and pulled using one's hand. The handle comprises a central planar portion adapted to be mounted on the handlebar of the golf cart, the central planar portion having an interior and an exterior. The handle includes a pair of winged planar portions diverging from the plane of the central portion, each of the wing portions having an interior and an exterior fixed to the exterior of the central planar portion. At least the interiors of the winged planar portions have aperture means for locating and retaining the fingers of one's hands. The exteriors of the central planar portion and the winged planar portions have notch means for locating and retaining the thumbs of one's hands. The interior of the central planar portion includes further aperture means for locating and retaining the fingers of one's hand.

The above and other objects and advantages of the present invention will become more apparent from the following description, claims and drawings.

BRIEF DESCRIPTION OF THE DRAWINGS

The drawings illustrate the best mode presently contemplated of carrying out the invention. In the drawings:

FIG. 1 is a perspective view of a non-motorized golf cart employing the golf cart handle embodying the present invention;

FIG. 2 is a side view of the golf cart shown in FIG. 1;

DETAILED DESCRIPTION OF THE PREFERRED EXEMPLARY EMBODIMENT

Figure 3:
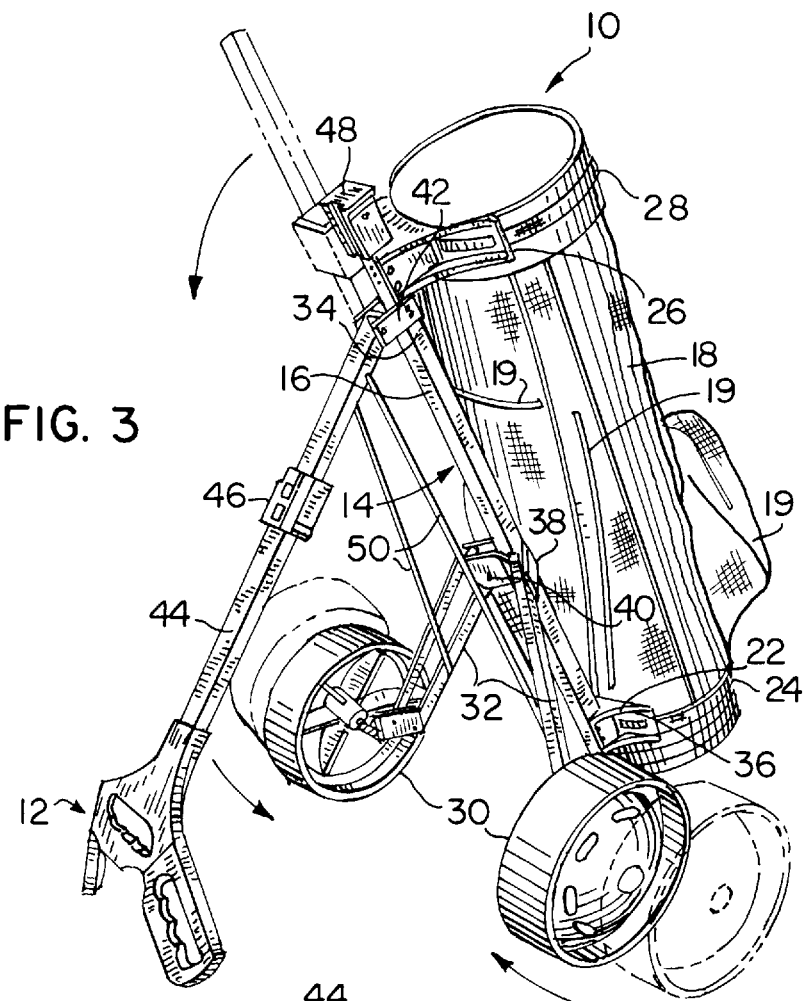
FIG. 3 is a perspective view of the golf cart of FIG. 1 being collapsed into a storage position.

Referring to FIG. 1, a conventional, pull-type golf cart 10 is shown with a handle 12 embodying the present invention installed on the cart. Golf cart 10 includes a bag support frame 14 having a centrally disposed, tubular central member 16 which extends generally parallel with the longitudinal axis of a golf bag 18 supported on the cart 10. Golf bag 18 typically includes at least one or more accessory pockets 19 held opened or closed by a zipper or the like. Attached to a lower end of central tubular member 16 is a bag support plate 20 against which the bottom of golf bag 18 rests. A curved bracket 22 serves as a strap holder for a lower strap 24 used to encircle the bottom of golf bag 18 to maintain the bag on the cart 10. At the upper end of the central tubular member 16 is a second curved bracket 26 for holding an upper strap 28 which surrounds the upper end of bag 18.

Figure 4:
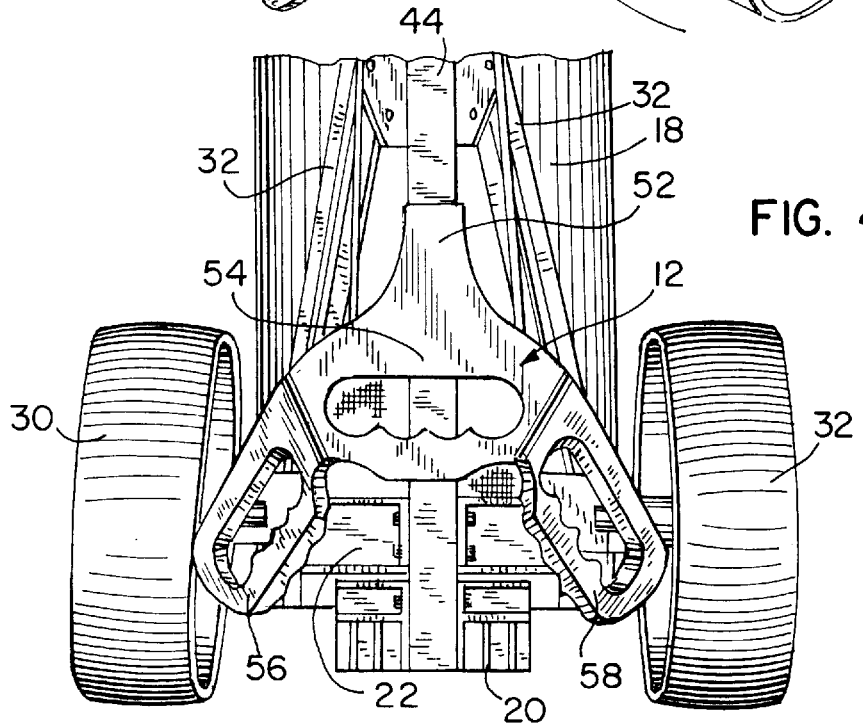
FIG. 4 is an enlarged partial, rear view of a collapsed golf cart illustrating the golf cart handle in the storage position.
Figure 5:
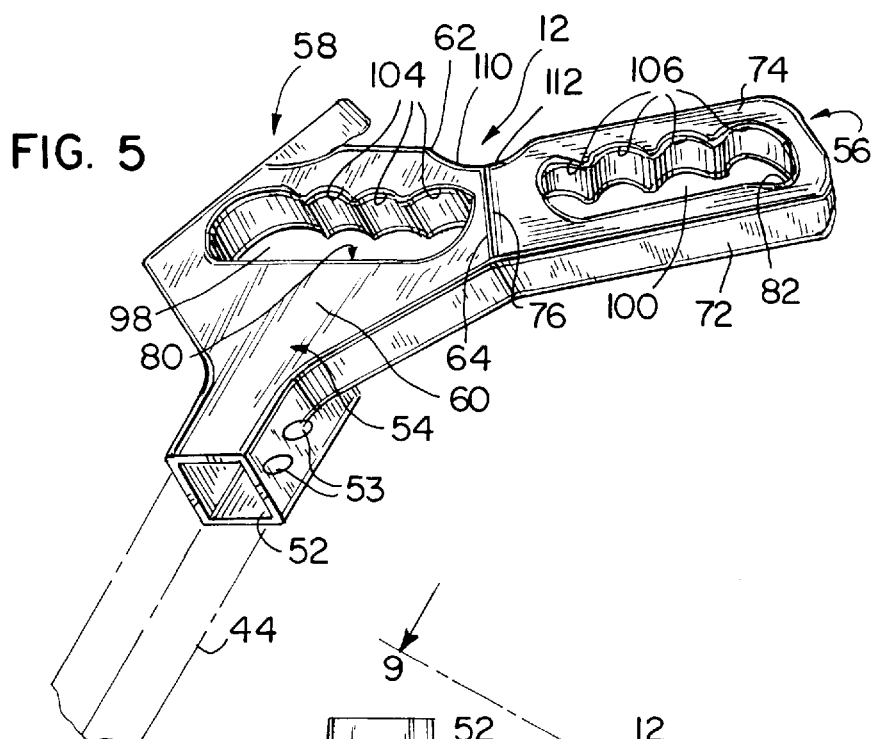
FIG. 5 is a perspective view of the golf cart handle.
Figure 6:
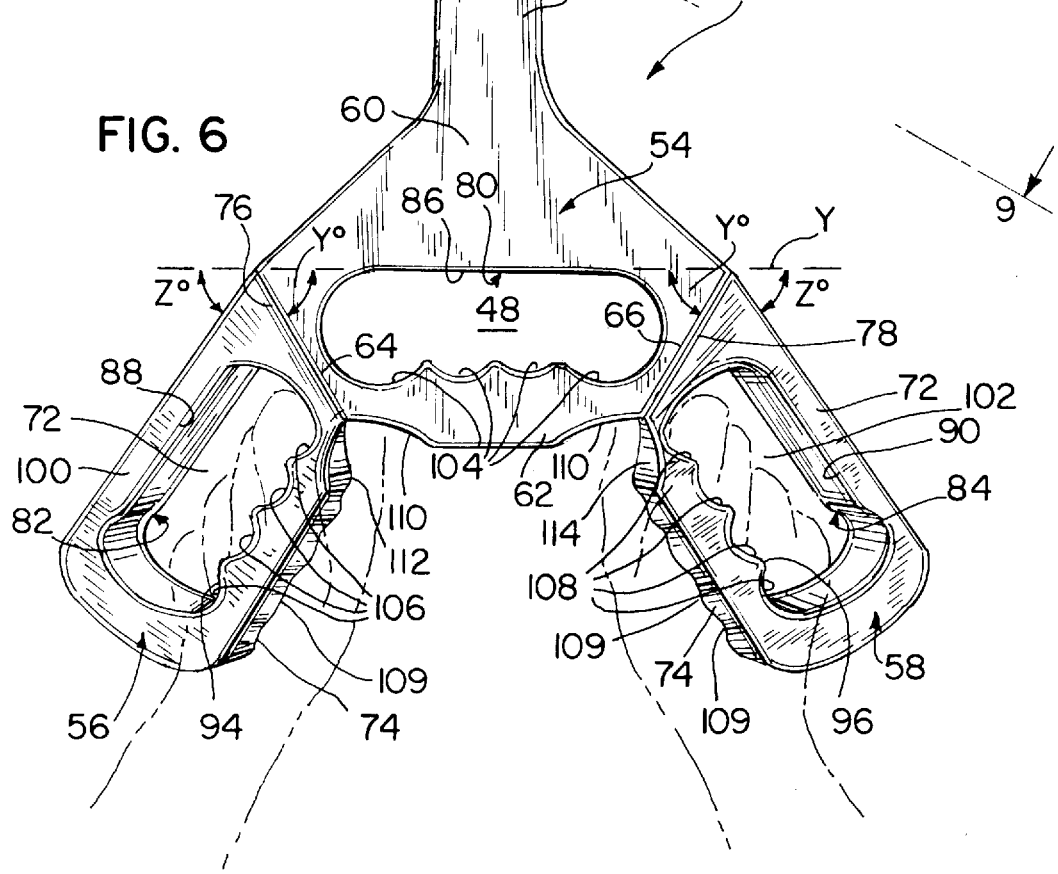
FIG. 6 is a top view of the golf cart handle shown in FIG. 5 and showing in phantom lines a golfer's two-handed grip.
Figure 7:
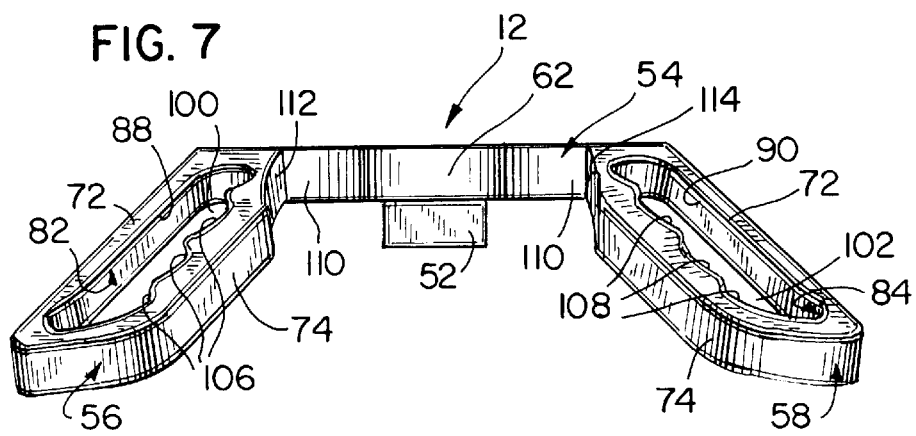
FIG. 7 is a front view of the golf cart handle shown in FIG. 6.
Figure 8:
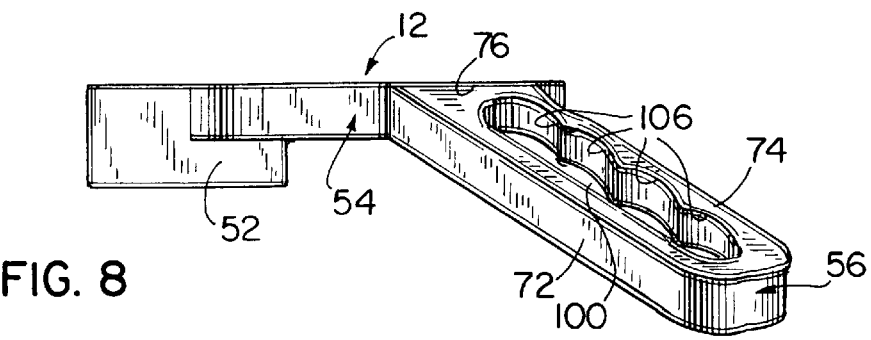
FIG. 8 is a view taken from the left hand side of FIG. 7.

A pair of cart wheels 30 are attached to frame by a pair of angled struts 32 which serve as wheel support members. Struts 32 are attached to tubular central member 16 of frame 14 at a point centrally positioned between first and second ends 34, 36, respectively. An attaching yoke 38 clamped onto tubular central member 16 secures wheel struts 32 to the frame 14. The wheel struts 32 include fasteners 40 adjacent the clamping yoke 38 to enable the struts 32 to pivot with respect to the yoke 38. Directly beneath the second curved bracket 26 is a clamp 42 to which the lower end of an elongated handlebar 44 is pivotally mounted. Looking at FIG. 3, the elongated handlebar 44 carries a slidable locking member 46 having a tongue which is engageable in a groove of a locking block 48 fixedly joined to the elongated handlebar 44 above the second curved bracket 26. When the tongue of locking member 46 is engaged with the groove of locking block 48, elongated handlebar 44 is fixed in an offset, extended position generally parallel to tubular central member 16 as seen in FIG. 2. Elongated rods 50 are fixedly connected at their lower ends to struts 32 and pivotally secured at their upper ends to elongated handlebar 44 between locking block 48 and clamp 38. As is well known, sliding the locking member 46 upwardly along handlebar 44 and disabling the tongue and groove engagement will allow handlebar 44 to be pivoted downwardly and simultaneously will cause the wheels 30 to be pivoted downwardly and inwardly (FIG. 3) into a collapsible storage or transport position as shown in FIG. 4.

In accordance with the invention, the handle 12 for moving and storing the cart 10 is fixedly attached to the uppermost end of elongated handlebar 44 by means of a hollow mouth 52 on the lower end of the handle 12 into which the upper end of elongated handlebar 44 is matingly received and secured by fasteners 53 (FIG. 2). Although the cross-section of the handlebar 44 in the preferred embodiment is square or rectangular, it should be understood that the cross-section of handlebar 44 could just as well be round or polygonal as long as the mouth 52 is conformingly shaped. As will hereafter be described, the invention resides in the shape and orientation of the handle 12 which will conveniently allow the golf cart 10 to be pushed or pulled using either two hands or one hand in a manner which will advantageously distribute pulling pressure throughout the golfer's back, shoulders and arms.

Referring now to FIGS. 5–9, golf cart handle 12 is a one-piece, multi-planar member preferably molded from a durable plastic material. The handle is comprised of a central planar portion 54 flowing from the mouth 52 to which handlebar 44 is attached, and a pair of laterally disposed winged planar portions 56, 58 which are angularly connected to and diverge from central planar portion 54 such that each of the winged planar portions 56, 58 extends outwardly, upwardly and rearwardly of the central planar portion 54.

Central portion 54 includes a top wall 60 and a bottom wall 62 which are connected by a pair of sidewalls 64, 66 defining an interior and an exterior. Each of the winged portions 56, 58 has a top wall 72, a bottom wall 74 and sidewalls 76, 78 also defining an interior and an exterior. Each of the winged portions 56, 58 is angularly and fixedly attached to one of the sidewalls 64, 66 of central portion 54. As will be appreciated hereafter, each of central portion 54 and winged portions 56, 58 are formed with apertures for receiving the fingers of one's hand to be wrapped around the bottom wall 62 of central portion 64 or the bottom walls 74 of winged portions 56, 58.

Central portion 54 and winged portions 56, 58 are each formed with a continuous, inner wall 80, 82, 84, respectively, having a top segment 86, 88, 90, respectively, merging with a bottom segment 92, 94, 96, respectively, and defining a substantially elongated slot 98, 100, 102, for locating and receiving the fingers of one's hand. Each of the walls 80, 82, 84 includes a scalloped formation 104, 106, 108, respectively, along the respective bottom segment 92, 94, 96 thereof for locating and receiving the fingers of one's hand. In addition, each of the walls 74 of the winged portions 56, 58 are formed with notches 109 which cooperate with the scalloped formations 106, 108 to form pistol style grips. Central portion 56 and each of the winged portions 56, 58 are formed with a notch 110, 112, 114, respectively, for locating and receiving the thumb of one's hand.

Figure 9:
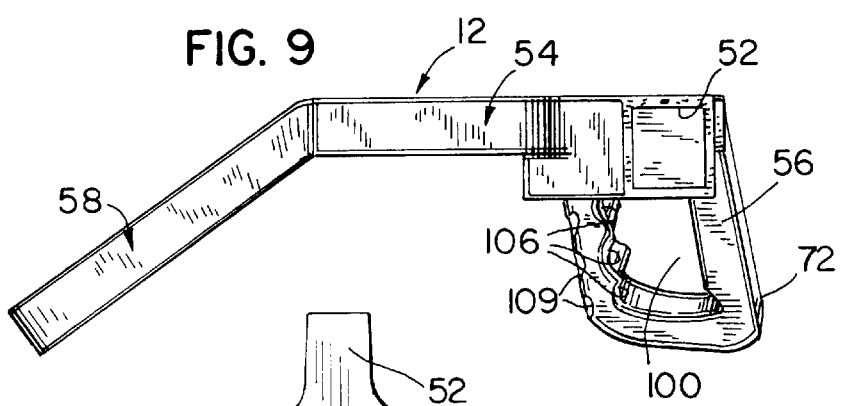
FIG. 9 is a view taken on line 9—9 of FIG. 6.

As a salient feature of the invention, each of the winged portions 56, 58 is oriented at an angle X° in the range of 140° to 150° and preferably 145° relative to central portion 54 as best depicted in FIG. 9. Each winged portion 56, 58 is also joined to central portion 54 along a line defined by the junction of sidewalls 64, 76 and 66, 78 displaced Y° or approximately 60° from a horizontal axis Y (FIG. 6) bisecting central portion 54. In addition, each winged portion 56, 58 extends downwardly from the axis Y at an angle Z° in the range of 50° to 55°0 relative thereto.

In the central portion 54, elongated slot 98 and scalloped portion 104 define a first pistol style grip adapted to be grasped by one's hand. In like fashion, in each of the winged portions 56, 58, elongated slots 100, 102, scalloped portions 106, 108 and thumb portions 112, 114 form a second pistol style grip also adapted to be grasped by one's hand.

Figure 10:
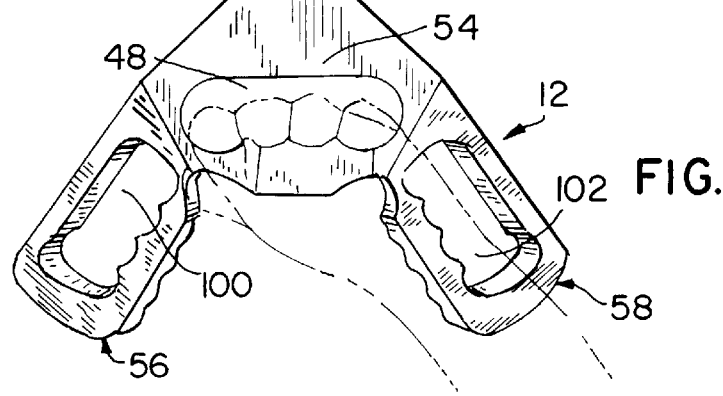
FIG. 10 is a top view similar to FIG. 6, but showing in phantom lines, a golfer's one-handed grip.

In use, with the handle 12 in position on handlebar 44, as shown in FIGS. 1 and 2, the golfer grips the handle 12 with two hands along winged portions 56, 58 (FIG. 6) or, alternatively, grips the handle 12 at center portion 54 with either the right hand or left hand (FIG. 10). In either case, the golfer's fingers and thumb(s) are located by the scalloped formations 104, 106, 108 and the notches 110, 112, 114 formed interiorly and exteriorly on the central and winged portions 54, 56, 58. As a result, the golfer is able to push or pull the cart in a manner which will equally distribute the pulling or pushing force among the arms, shoulders and back and thereby ease the transport of the loaded bag. When the golfer is ready to collapse golf cart 10, it should be appreciated that the handle may be pivoted downwardly so as to store handle 12 between the collapsed wheels 30.

It should be understood that the present invention provides a multi-planar handle which may be used on newly produced as well as existing golf cart handlebars. The golf cart handle of the present invention advantageously allows the walking golfer to use either a two-handed or one-handed grip in a manner which will reduce stress in the upper body of the golfer. Unlike the prior art, the present invention disposes the golf cart handle at an angular orientation which eases the transport of the golf cart and conserves the energy of the golfer for his or her game.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

I claim:

1. A multi-planar golf cart handle adapted to be gripped using one's hands, said handle comprising:
    a central planar portion adapted to be mounted to the golf cart; and
    a pair of laterally disposed, winged planar portions, each of said winged planar portions being connected to said central portion at an angle such that each of said winged planar portion extends outwardly, upwardly and rearwardly of said central planar portion;
        wherein each of said winged planar portions is oriented at an angle in the range of 140° to 150° relative to said central planar portion and joined to said central planar portion along a line which is displaced approximately 60° from a horizontal axis bisecting said central portion, and each of said winged planar portions extends downwardly from said horizontal axis bisecting said central planar portion at an angle in the range of 50° to 55°.

2. The multi-planar handle of claim 1, wherein said central planar portion and said winged planar portions are each formed with a continuous, inner wall having a top segment merging with a bottom segment and defining a substantially elongated slot for receiving the fingers of one's hand.

3. The multi-planar handle of claim 2, wherein each of said walls includes a scalloped formation along said bottom segment thereof.

4. The multi-planar handle of claim 1, wherein said central planar portion and each of said winged planar portions are formed with a notch for receiving the thumb of one's hand.

5. A multi-planar handle adapted to be attached to a handlebar of a non-motorized golf cart adapted to be pushed and pulled using one's hands, said handle comprising:
    a central planar portion adapted to be mounted on the handlebar of the golf cart, said central planar portion providing a first pistol style grip adapted to be gripped by one's hand; and
    a pair of laterally disposed winged planar portions angularly connected to said central planar portion such that each of said winged planar portions extends outwardly, upwardly and rearwardly of said central planar portion, each of said winged planar portions providing a second pistol style grip adapted to be gripped by one's hand, wherein each of said winged planar portions is oriented at an angle in the range of 140° to 150° relative to said central planar portion and joined to said central planar portion along a line which is displaced approximately 60° from a horizontal axis bisecting said central portion, and each of said winged planar portions extends downwardly from said horizontal axis bisecting said central planar portion at an angle in the range of 50° to 55°.

6. A multi-planar handle adapted to be fixed to a handlebar of a pullable/pushable golf cart, said handle comprising:
    a central planar portion adapted to be mounted on the handlebar of the golf cart, said central planar portion having a top wall and a bottom wall connected by a pair of sidewalls, and
    a pair of laterally disposed, winged planar portions, each of said winged planar portions being angularly and fixedly attached to one of said sidewalls of said central portion such that each of said winged planar portions extends outwardly, upwardly and rearwardly of said central planar portion, and each of said winged portions having a top wall and a bottom wall connected by a pair of sidewalls,
    each of said central planar portion and said winged planar portions being formed with an aperture for receiving the fingers of one's hand to be wrapped about said bottom wall of said central planar portion or said bottom walls of said winged planar portions, and
    wherein each of said winged planar portions is oriented at an angle in the range of 140° to 150° relative to said central planar portion and joined to said central planar portion along a line which is displaced approximately 60° from a horizontal axis bisecting said central portion and each of said winged planar portions extends downwardly from said horizontal axis bisecting said central planar portion at an angle in the range of 50° to 55°.

7. The multi-planar handle of claim 6, wherein each of said bottom walls of said central planar portion and said winged planar portions are formed with notches for receiving the thumb of one's hand.

8. A multi-planar handle adapted to be fixed to a handlebar of a golf cart adapted to be pushed and pulled using one's hands, said handle comprising:

a central planar portion adapted to be mounted on the handlebar of the golf cart, said central planar portion having an interior and an exterior, and a pair of winged, planar portion diverging form the plane of said central portion such that each of said winged planar portion extends outwardly, upwardly and rearwardly of said central planar portion, each of said winged portions having an interior and an exterior fixed to said exterior of said central planar portion, at least said interiors of said winged planar portions having aperture means for locating and retaining the fingers of one's hands, and said exteriors of said central planar portion and said winged planar portion having notch means for locating and retaining the thumbs of one's hands, and wherein each of said winged planar portions is oriented at an angle in the range of 140° to 150° relative to said central planar portion and joined to said central planar portion along a line which is displaced approximately 60° from a horizontal axis bisecting said central portion, and each of said winged planar portions extends downwardly from said horizontal axis bisecting said central planar portion at an angle in the range of 50° to 55°.

9. The multi-planar handle of claim 8, wherein said interior of said central planar portion includes further aperture means for locating and retaining the fingers of one's hand.

10. A multi-planar wheeled carriage handle adapted to be gripped using one's hands, said handle comprising:

a central planar portion adapted to be mounted on the wheeled carriage; and a pair of laterally disposed, winged planar portions, each of said winged planar portions being connected to said central planar portion at an angle such that each of said winged planar portions extends outwardly, upwardly and rearwardly of said central planar portion, and wherein each of said winged planar portions is oriented at an angle in the range of 140° to 150° relative to said central planar portion and joined to said central planar portion along a line which is displaced approximately 60° from a horizontal axis bisecting said central portion and each of said winged planar portions extends downwardly from said horizontal axis bisecting said central planar portion at an angle in the range of 50° to 55°.

\* \* \* \* \*